No. 698,616. Patented Apr. 29, 1902.
J. M. ZWERNER.
LIFTING AND CARRYING DEVICE.
(Application filed Aug. 8, 1901.)

(No Model.)

WITNESSES:
H. B. Bradshaw
A. L. Phelps

INVENTOR.
John Mike Zwerner
BY
C. C. Shepherd
ATTORNEY.

UNITED STATES PATENT OFFICE.

JOHN MIKE ZWERNER, OF MARYSVILLE, OHIO.

LIFTING AND CARRYING DEVICE.

SPECIFICATION forming part of Letters Patent No. 698,616, dated April 29, 1902.

Application filed August 8, 1901. Serial No. 71,304. (No model.)

*To all whom it may concern:*

Be it known that I, JOHN MIKE ZWERNER, a citizen of the United States, residing at Marysville, in the county of Union and State of Ohio, have invented a certain new and useful Improvement in Lifting and Carrying Devices, of which the following is a specification.

My invention relates to the improvement of lifting and carrying devices; and the objects of my invention are to provide a simple and effective device of this character by which cuspidors and other similar vessels may be readily clasped, elevated from the floor, and carried either singly or one upon the other, thereby obviating the necessity of touching the vessel with the hand, to so construct said device as to permit of its being produced in a neat and inexpensive form, and to provide other improvements the details of which will be more fully pointed out hereinafter. These objects I accomplish in the manner illustrated in the accompanying drawings, in which—

Figure 1:
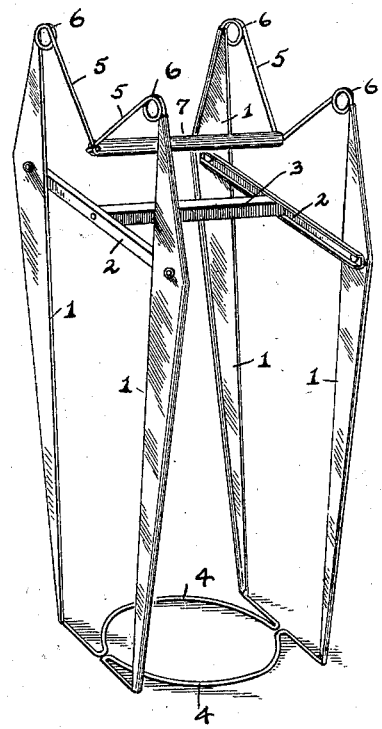
Figure 2:
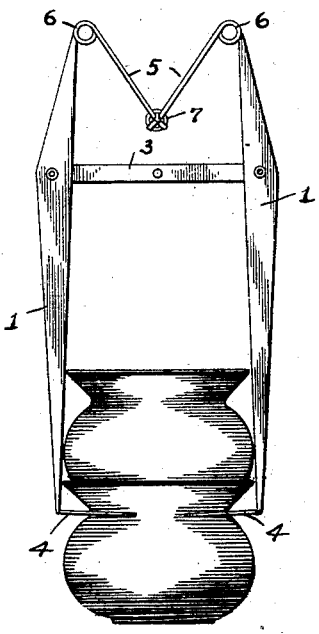

Figure 1 is a view in perspective of my device; and Fig. 2 is a side elevation of the same, showing two cuspidors supported thereby.

Similar numerals refer to similar parts throughout the several views.

In carrying out my invention I employ two opposing side frames, each comprising two standards or upright bars 1, which in their normal positions diverge in their upper portions. The standards of each pair above the centers of their lengths are connected by a transverse bar 2, the latter having its ends pivotally connected with said standards. These bars 2 are connected centrally by a transverse connecting-piece 3. The corresponding or opposite standards 1 of the opposing pairs have their lower ends connected through the medium of transversely-arranged connecting and clamping wires 4, each of these wires having its central portion formed with an outward bow and the ends of said bowed portions being held closed together or in contact with each other in the manner hereinafter described. The upper ends of the standards 1 of each pair are provided with inward and downward inclined spring-wires 5, each of said wires having formed therein one or more spring-coils, such as are indicated at 6. Each pair of the wires 5 have their inner or lower ends connected with one end of a transverse handle bar or rod 7, which, as indicated in the drawings, is arranged above the transverse bar 3. As indicated in the drawings, each of the wires 5 and 4 may be continued throughout the length of the standard 1, with which it is connected, thus adding strength or rigidity to said standard. It will be understood that the lower ends of the standards 1 are normally pressed toward each other and the clamping-bows 4 caused to normally contact at their ends through the action of the springs 6.

In utilizing my invention the clamping-bows 4 are thrown outward or forced away from each other the desired distance to permit of the same being dropped over the upper or flaring end of a cuspidor or other vessel by grasping both the handle-rod 7 and transverse bar 3 with the hand and pressing said handle-bar toward said lower bar. The clamping bows or yokes 4 having thus been made to receive the object to be lifted, the pressure on the handle-bar 7 is released, with the result that said clamping-bows will spring into clamping engagement with the cuspidor or other object to be lifted, thus permitting the raising of both the lifting device and the object held thereby without the hands coming into contact with the latter. From this operation it will be seen that a simple, reliable, and effective lifting and carrying device is provided by means of which cuspidors and other articles of a nature undesirable for handling may be readily lifted and moved.

In Fig. 2 of the drawings I have shown two cuspidors supported by my device, this being accomplished by grasping and lifting one cuspidor and setting it upon the other, then releasing the upper and grasping the lower between the clamping-bows.

Having now fully described my invention, what I claim, and desire to secure by Letters Patent, is—

In a lifting and carrying device, the combination of opposing side frames, comprising pairs of standards 1, connected bars 2 jointedly connecting said standards as described, a transverse handle-bar 7, spring-wires connecting the latter with the upper ends of said standards and clamping-wires connecting the lower ends of the standards of opposite pairs, substantially as specified.

JOHN MIKE ZWERNER.

In presence of—
J. C. POOLER,
HERMAN PLATZ.